US 6,734,793 B1

(12) United States Patent
Dreyer et al.

(10) Patent No.: US 6,734,793 B1
(45) Date of Patent: May 11, 2004

(54) METHOD OF TRANSMITTING A MEASUREMENT SIGNAL BETWEEN A MEASURING UNIT AND A CONTROL UNIT

(75) Inventors: Volker Dreyer, Lörrach (DE); Alexander Müller, Steinen (DE); Jürgen Meier, Bad Säckingen (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/615,148

(22) Filed: Jul. 13, 2000

(30) Foreign Application Priority Data

Mar. 15, 2000  (EP) ............................................. 00105513

(51) Int. Cl.$^7$ .............................................. G08B 29/00
(52) U.S. Cl. ..................... 340/506; 340/3.1; 340/3.31; 340/511; 700/10; 700/11; 700/12
(58) Field of Search .................... 340/506, 3.1, 3.31, 340/3.5, 501, 511, 517; 700/10, 11, 12

(56) References Cited

U.S. PATENT DOCUMENTS 5,136,285 A  *  8/1992  Okuyama  .............. 340/870.11
6,344,802 B1  *  2/2002  Otsuka et al.  ............. 340/825

\* cited by examiner

*Primary Examiner*—Daryl Pope
(74) *Attorney, Agent, or Firm*—Bose McKinney & Evans LLP

(57) ABSTRACT

In a method of transmitting a measurement signal M between a measuring unit 1 and a control unit 10, the uniform measurement signal has a supplementary signal Z superimposed on it which alternates over time. To check the operation of the measuring unit 1, the measurement signal M is evaluated in the control unit 10. If the supplementary signal Z is erroneous, the control unit 10 produces an alarm signal.

21 Claims, 2 Drawing Sheets

Figure 1:
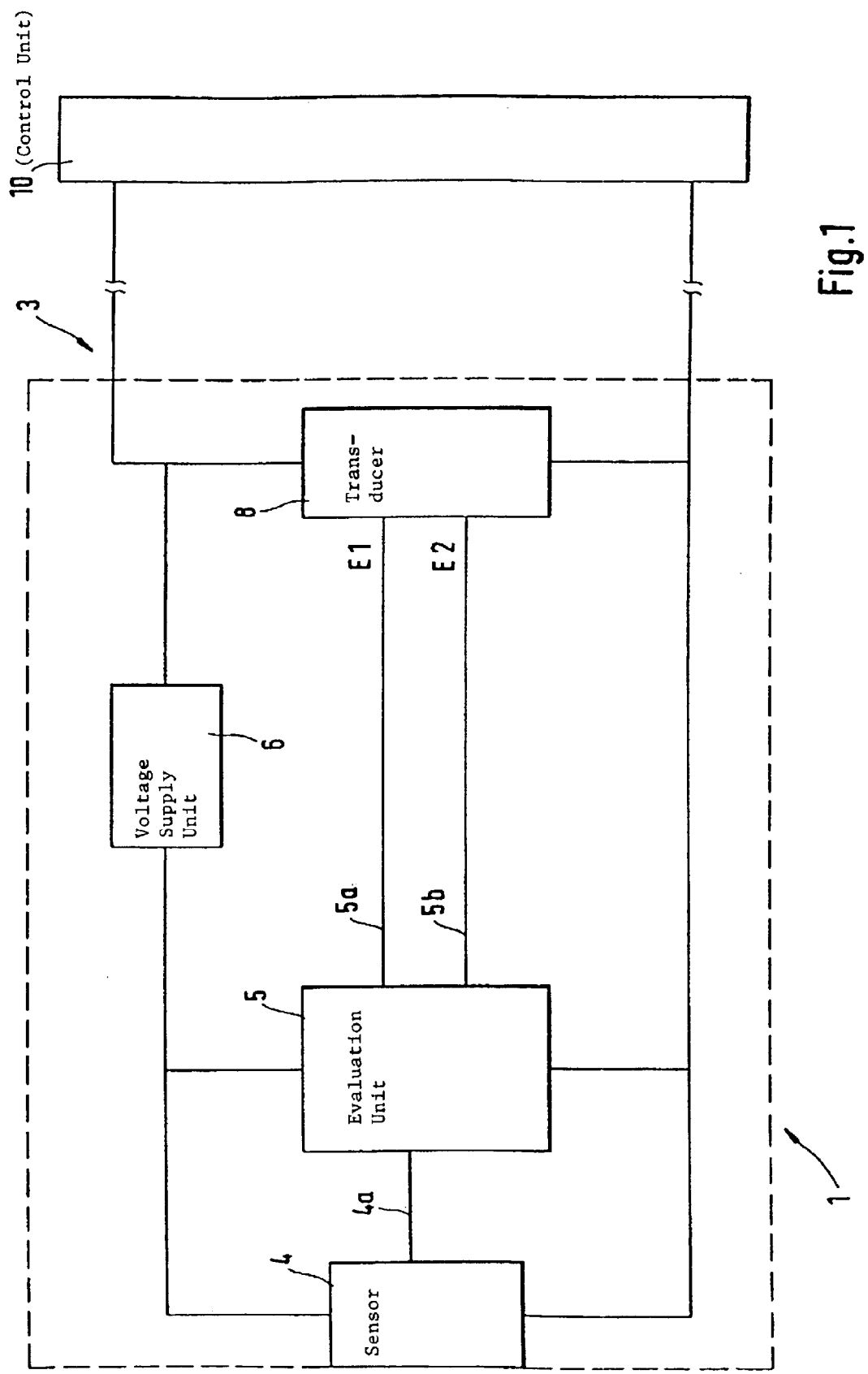

METHOD OF TRANSMITTING A MEASUREMENT SIGNAL BETWEEN A MEASURING UNIT AND A CONTROL UNIT

The invention relates to a method of transmitting a measurement signal between a measuring unit and a control unit.

In automation technology and process control technology, measured variables are frequently recorded on various process units and passed to a more remote control unit. The control unit controls the process cycle on the basis of the information about the state of the process units. The measured variables are recorded on the process units by means of measuring units and are converted into measurement signals which are transmitted to the central control unit. The measurement signals can assume continuously varying levels or else discrete levels, depending on whether a continuous measured variable or a discrete measured variable is recorded.

As an example, a limit switch for the filling level in a tank container can assume only two switching states, "limit level reached" and "limit level not yet reached". This information is transmitted to the control unit as a discrete measurement signal which is uniform over time. If the switching state of the limit switch changes, e.g. because the liquid reaches the limit level, then the measurement signal changes accordingly.

If a malfunction occurs in the measuring unit, during which the measuring unit continues to output the original uniform measurement signal but no longer reacts to changes in the measured variable, then the control unit is not able to recognize the malfunction. The control unit continues to assume that the transmitted measurement signal is valid and, on the base of this misinformation, controls the process cycle incorrectly. Process control based on an invalid measurement signal results in unwanted erroneous process reactions. This needs to be prevented, particularly in processes which are relevant to safety.

The object of the invention is to specify a method of transmitting a measurement signal between a measuring unit and a control unit, in which the control unit can be used to recognize a malfunction in the measuring unit.

This object is achieved by a method of transmitting a measurement signal between a measuring unit and a control unit, in which a uniform measurement signal has a supplementary signal superimposed on it which alternates over time and is evaluated in the control unit to monitor the measuring unit, and, if the supplementary signal is erroneous, an alarm signal is produced.

This method ensures that a malfunction in the measuring unit is easily recognized and process control based on an erroneous measurement signal is prevented. This significantly increases the reliability of the process.

Advantageous further developments of the invention are specified in the subclaims.

Figure 2A:
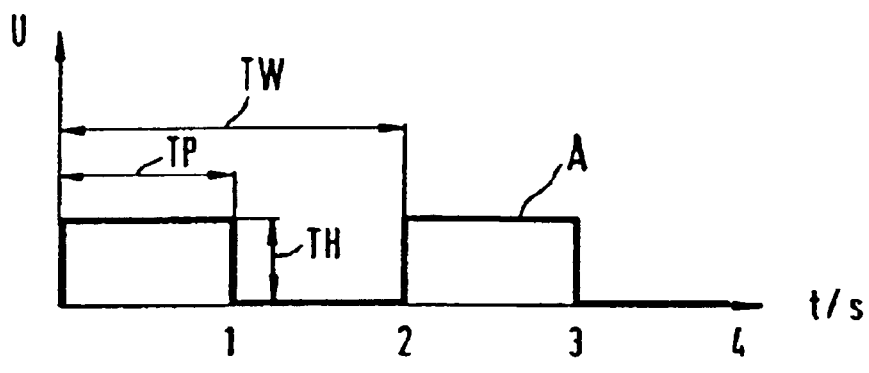
Figure 2B:
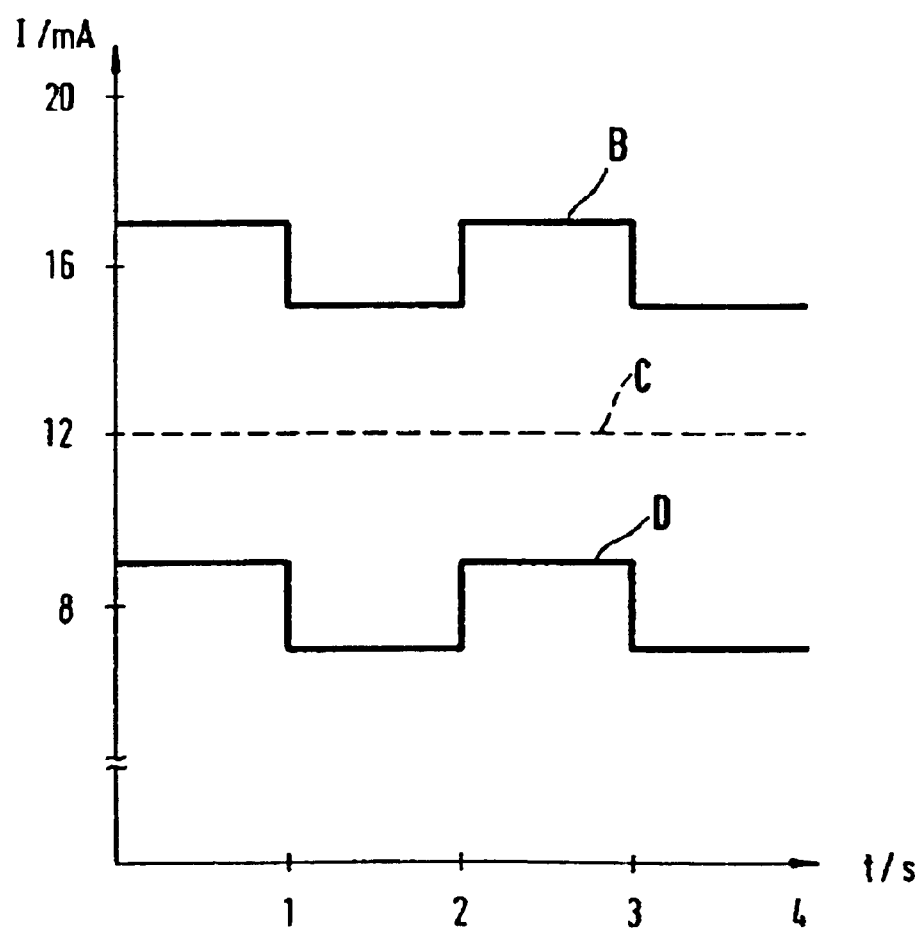

The invention is explained in more detail below with the aid of a preferred illustrative embodiment shown in the drawing, in which:

FIG. 1 shows a schematic illustration of a measuring unit connected to an evaluation unit, and FIG. 2 shows the timing of a measurement signal.

FIG. 1 shows a measuring unit 1 which is connected to a control unit 10 via a transmission line 3. The measuring unit 1 essentially comprises a sensor 4, used for recording a measured variable, an evaluation unit 5 and a measurement transducer 8, used for transmitting the measured variable information. The measured variable can, as an example, be the limit level in a tank container filled with liquid. The sensor 4 then recognizes whether or not the liquid in the tank container reaches a particular limit level. The sensor 4 is connected to the evaluation unit 5 via a connecting line 4a. The evaluation unit 5 evaluates the sensor signal S from the sensor 4 and produces a corresponding control signal. The voltage supply used for the sensor 4 and for the evaluation unit 5 is a voltage supply unit 6 which is directly connected to a transmission line 3.

The transmission line 3 is connected to the control unit 10, which is used for controlling the process. Further sensors and actuators, which are likewise connected to the control unit 10, are not shown in more detail. These sensors which are not shown supply the control unit 10 with further information about process variables (e.g. pressure, temperature, throughput) on particular process units. The actuators (not shown) are used by the control unit 10 to control the process cycle. If, by way of example, a limit level switch in the control unit 10 reports that a limit level has been reached, the control unit 10 actuates a valve arranged in the inlet to the tank container. As a result of the actuation, the valve is closed and further admission of liquid into the tank container is prevented.

Two control lines 5a, 5b are connected between the evaluation unit 5 and a measurement transducer 8 which is used to produce the actual measurement signal. In the case shown, the measurement transducer 8 is a controllable current source whose output current depends on the control signals applied to its two inputs E1 and E2.

The operation of the measuring unit 1 is described in more detail below. The sensor 4 records a measured variable M. This measured variable M is the basis of a particular electrical sensor signal S which is supplied to the evaluation unit 5. The evaluation unit 5 evaluates the sensor signal S. If the sensor 4 is, by way of example, a familiar tuning-fork limit switch operating on the tuning-fork principle, the frequency of the sensor signal S depends on whether or not the limit switch is covered with liquid. The frequency of the sensor signal S is monitored in the evaluation unit 5. Depending on the frequency of the sensor signal, the evaluation unit 5 produces an appropriate control signal A1 (not covered) or A2 (covered) which is supplied to the input E1 of the measurement transducer 8 via the control line 5a. The control signal has only two values A1 and A2. In addition, the evaluation unit 5 produces a control signal A2 which varies over time and is supplied to the input E2 of the measurement transducer 8 via the control line 5b. If the evaluation unit 5 has a microprocessor, the control signal A2 assumes the two digital level states "low" and "high". The signal A2 which varies over time is a square-wave signal whose shape is equivalent to that of the signal shown in FIG. 2.

The measurement transducer 8 produces the measurement signal M shown in FIG. 2 at its output. The measurement signal M comprises a constant component 8 mA or 16 mA which has a supplementary signal Z superimposed on it which varies over time. The measurement signal can thus assume only two different levels. In the case illustrated, the supplementary signal Z which varies over time comprises a periodic pulse train P having a pulse width TP=1 sec., a pulse height TH=1 mA and a repetition time TW=2 sec. These specific values are naturally only illustrative. The pulse train is equivalent to the control signal A2 produced by the evaluation unit 5.

The control unit 10 evaluates the measurement signal M. If the measurement signal M has the correct supplementary signal Z, it can be inferred from this that the evaluation unit 5 is operating correctly. However, if the measurement signal M has no supplementary signal, this means that the evaluation unit 5 is not operating correctly. In this case, the mean level of the measurement signal can no longer be used to infer the measured variable. This also applies if the measurement signal M has an erroneous supplementary signal, e.g. having an incorrect period.

In this case, the control unit 10 produces an alarm signal indicating that the measuring unit 1 is malfunctioning.

The method according to the invention is particularly suitable if the transmission line is a two-core cable. This means that voltage is supplied to the measuring unit 1 and signals are transmitted via a common connecting line in the transmission line 3. Two-core cables are frequently in the form of 4–20 mA current loops. The measurement signals transmitted from the measuring unit 1 to the control unit 10 are then current signals in the range of 4–20 mA.

The method according to the invention provides a simple way of monitoring the measuring unit 1 from the control unit 10. As soon as the supplementary signal deviates, it can be inferred that the measuring unit 1 is malfunctioning. This malfunction is then indicated by the control unit 10 using an appropriate display.

What is claimed is:

1. A method of transmitting a measurement signal between a measuring unit and a control unit, the method comprising the steps of:

generating a measurement signal, superimposing a supplementary signal on the measurement signal, and evaluating the supplementary signal in the control unit to determine whether the measuring unit is malfunctioning.

2. A method of transmitting a measurement signal between a measuring unit and a control unit, the method comprising the steps of:

generating a measurement signal, superimposing a supplementary signal on the measurement signal, and evaluating the supplementary signal in the control unit to check the operation of the measuring unit.

3. The method as claimed in claim 2, wherein the supplementary signal is a square-wave signal.

4. The method as claimed in claim 2, wherein the measurement signal can assume only two levels.

5. The method as claimed in claim 2, wherein the measuring unit is a limit switch.

6. The method as claimed in claim 2, wherein the measurement signal is transmitted via a two-core cable.

7. The method as claimed in claim 6, wherein the two-core cable is in the form of a 4–20 mA current loop.

8. A device for carrying out the method as claimed in claim 2.

9. The method as claimed in claim 3, wherein the measurement signal can assume only two levels.

10. The method as claimed in claim 3, wherein the measurement signal is transmitted via a two-core cable.

11. The method as claimed in claim 4, wherein the measurement signal is transmitted via a two-core cable.

12. The method as claimed in claim 5, wherein the measurement signal is transmitted via a two-core cable.

13. A device for carrying out the method as claimed in claim 3.

14. A device for carrying out the method as claimed in claim 4.

15. A device for carrying out the method as claimed in claim 5.

16. A device for carrying out the method as claimed in claim 6.

17. A device for carrying out the method as claimed in claim 7.

18. The method of claim 2, wherein the supplementary signal alternates over time.

19. The method of claim 2, further comprising the step of producing an alarm signal when the supplementary signal contains an error.

20. The method as claimed in claim 3, wherein the measuring unit is a limit switch.

21. The method as claimed in claim 4, wherein the measuring unit is a limit switch.

* * * * *